(12) United States Patent
Marupaduga

(10) Patent No.: US 11,523,452 B1
(45) Date of Patent: Dec. 6, 2022

(54) ALLOCATING WIRELESS AIR INTERFACE RESOURCES TO RELAY NODES BASED ON END-USER WIRELESS DEVICE CAPABILITIES

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 1 day.

(21) Appl. No.: 17/008,389

(22) Filed: Aug. 31, 2020

(51) Int. Cl.
| | | |
|---|---|---|
| *H04W 76/15* | (2018.01) | |
| *H04W 8/24* | (2009.01) | |
| *H04W 28/02* | (2009.01) | |
| *H04W 76/11* | (2018.01) | |
| *H04W 84/04* | (2009.01) | |
| *H04W 92/10* | (2009.01) | |

(52) U.S. Cl.
CPC ............ *H04W 76/15* (2018.02); *H04W 8/24* (2013.01); *H04W 28/0268* (2013.01); *H04W 76/11* (2018.02); *H04W 84/042* (2013.01); *H04W 92/10* (2013.01)

(58) Field of Classification Search
CPC ....... H04W 76/15; H04W 76/11; H04W 8/24; H04W 28/0268; H04W 84/042
USPC .......................................................... 370/329
See application file for complete search history.

(56) References Cited

U.S. PATENT DOCUMENTS

| | | | |
|---|---|---|---|
| 10,292,095 B1* | 5/2019 | Park ..................... H04B 7/026 |
| 2014/0254543 A1* | 9/2014 | Engelhard ........... H04W 64/006 370/329 |
| 2014/0313945 A1* | 10/2014 | Beale ...................... H04L 5/16 370/277 |
| 2014/0337473 A1* | 11/2014 | Frusina ................. H04L 5/0058 709/217 |
| 2016/0380735 A1* | 12/2016 | Chung .................. H04B 7/155 370/329 |
| 2018/0139682 A1* | 5/2018 | Xu ........................ H04W 40/12 |
| 2020/0205062 A1* | 6/2020 | Azizi .................. H04W 68/005 |

FOREIGN PATENT DOCUMENTS

WO   2020/067986 A1   4/2020

* cited by examiner

*Primary Examiner* — Congvan Tran

(57) ABSTRACT

Prioritizing air interface resource allocation for relay nodes serving end-user wireless devices with higher bandwidth capabilities, such as 5G and beyond, versus relay nodes serving end-user wireless devices that do not have such capabilities. The bandwidth capability can be based on an average or threshold bandwidth capability of end-user wireless devices. Systems and methods disclosed are implemented in 5G EN-DC heterogeneous networks.

20 Claims, 10 Drawing Sheets

ALLOCATING WIRELESS AIR INTERFACE RESOURCES TO RELAY NODES BASED ON END-USER WIRELESS DEVICE CAPABILITIES

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, relay nodes are being deployed to improve service quality by relaying communication between an access node, and wireless devices in the wireless network. For example, relay nodes may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach. Relay nodes can include a combination of a relay wireless device physically coupled to a relay access point (AP). The relay wireless device provides the wireless connection between the AP and the donor access node, and such a wireless connection may be referred to as a wireless backhaul. Meanwhile the relay AP deploys the wireless air interface to which end-user wireless devices can attach. The relay wireless device can include a 5G-capable wireless device, thereby being able to avail of the aforementioned dual connectivity or EN-DC for a more robust wireless backhaul.

However, transitioning to these advanced technologies in today's heterogeneous wireless networks can be associated with problems. In particular, since relay nodes serve increasing numbers of end-user wireless devices, it must be ensured that the relay nodes themselves are provided with a high quality wireless backhaul, that is, the wireless connection between the relay node and the donor access node. Such considerations are further complicated when different types of relay nodes serve different types of end-user wireless devices. For example, various relay nodes have different capabilities, e.g. 5G relay nodes and 4G relay nodes, and may correspondingly serve end-user wireless devices that are also capable of either 5G or 4G. A 5G capable relay node may serve a large quantity of 4G capable end-user wireless devices, and a 4G capable relay node may serve a large quantity of 5G capable end-user wireless devices. Appropriate allocation of wireless air interface resources to different relay nodes thus becomes essential for ensuring service quality for the end-user wireless devices attached to the relay nodes.

OVERVIEW

Exemplary embodiments described herein include methods, systems, and processing nodes for allocating wireless air interface resources for relay nodes in heterogeneous networks based on bandwidth capabilities of end-user wireless devices attached to the relay nodes. The bandwidth capabilities can be associated with a capability of each end-user wireless device to participate in 4G LTE, 5G NR, or any other radio access technology (RAT).

An exemplary method for allocating wireless air interface resources to relay nodes based on end-user wireless device capabilities includes determining that a relay node within range of a donor access node is serving a threshold quantity of end-user wireless devices having a high bandwidth capability, and prioritizing data packets associated with the relay node over other data packets traversing the donor access node.

Another exemplary method for allocating wireless air interface resources to relay nodes based on end-user wireless devices attached to the relay nodes includes determining that a first relay node within range of a donor access node is serving a quantity of 5G-capable end-user wireless devices, the first quantity meeting a threshold, and prioritizing data packets received from the first relay node over data packets received from any other relay node that is not serving a threshold quantity of 5G-capable end-user wireless devices.

Another method for allocating wireless air interface resources to relay nodes based on end-user wireless devices attached to the relay nodes includes receiving, at a donor access node, a first resource request from a first relay node serving a first one or more end-user wireless devices, receiving, at the donor access node, a second resource request from a second relay node serving a second one or more end-user wireless devices, and preferentially allocating wireless air interface resources to one of the first or second relay nodes based on a bandwidth capability of the first or second one or more end-user wireless devices.

Another exemplary method for allocating wireless air interface resources to relay nodes based on end-user wireless devices attached to the relay nodes includes identifying a first relay node within range of a donor access node, identifying a second relay node within range of the donor access node, and preferentially allocating wireless air interface resources to one of the first or second relay nodes based on a bandwidth capability of end-user wireless devices attached to each relay node.

In another exemplary embodiment, a method for prioritizing relay nodes serving end-user wireless devices meeting a bandwidth criteria includes determining that a first bandwidth capability of end-user wireless devices attached to a first relay node meets a threshold, determining that a second bandwidth capability of end-user wireless devices attached to a second relay node does not meets a threshold, wherein both first and second relay nodes are attached to a donor access node, and prioritizing data packets received at the donor access node from the first relay node over data packets received at the donor access node from the second relay node.

The exemplary embodiments described herein may be performed by a processing node within a system, such as a telecommunication system. For example, an exemplary system for allocating wireless air interface resources to relay nodes in heterogeneous networks includes a donor access node configured to deploy at least a 4G wireless air interface and a 5G wireless air interface, and a processing node communicatively coupled to the donor access node. The processing node can be configured to perform operations including identifying two or more relay nodes within range of a donor access node, and preferentially allocating wireless air interface resources to the two or more relay nodes based on a bandwidth capability of end-user wireless devices attached to each relay node. The bandwidth capability can be associated with a capability of each end-user wireless device to participate in 4G LTE, 5G NR, or any other radio access technology (RAT).

In another exemplary embodiment, the processing node can be configured to perform operations including determining that a first bandwidth capability of end-user wireless devices attached to a first relay node meets a threshold, determining that a second bandwidth capability of end-user wireless devices attached to a second relay node does not meets a threshold, wherein both first and second relay nodes are attached to a donor access node, and prioritizing data packets received at the donor access node from the first relay node over data packets received at the donor access node from the second relay node. In such a system comprising EN-DC capable donor access node, the first relay node may be instructed to attach to the donor access node via at least two RATs simultaneously.

In another exemplary embodiment, a system for allocating wireless air interface resources to relay nodes in heterogeneous networks includes a donor access node, a first relay node serving a first plurality of end-user wireless devices, a second relay node serving a second plurality of end-user wireless devices, and a processing node communicatively coupled to the donor access node, the processing node configured to perform any of the aforementioned operations in any combination, such that the resources of the wireless air interface(s) deployed by the donor access node are utilized by end-user wireless devices that need them the most (i.e., end-user wireless devices capable of utilizing higher bandwidths).

DETAILED DESCRIPTION

Figure 1:
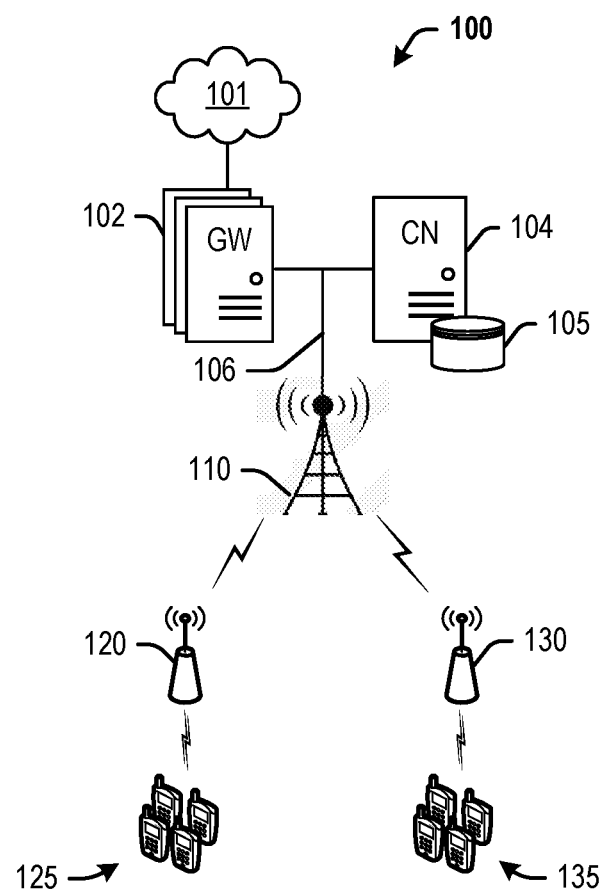
FIG. 1 depicts an exemplary system for allocating wireless air interface resources to relay nodes based on end-user wireless device capabilities.

The following disclosure provides methods and systems for prioritizing resource allocation for relay nodes that are serving end-user wireless devices with high bandwidth capabilities. Certain end-user wireless devices, such as 5G capable wireless devices, can be configured to utilize higher-bandwidth channels, thereby improving throughput versus other wireless devices that do not have such capabilities. Even among 5G capable wireless devices, some wireless devices may be configured to use higher bandwidths than other wireless devices. Therefore, a relay node that is serving a large amount of high-bandwidth capable end-user wireless devices (e.g. a threshold quantity, or a comparatively larger quantity than other relay nodes) can be allocated a greater amount of uplink or downlink resources of a wireless air interface. In particular, when the donor access node in a heterogeneous network is loaded (i.e. has limited wireless air interface resources available), preferentially allocating resources to relay nodes serving high-bandwidth end-user wireless devices ensures quality of service for end-user wireless devices attached to these relay nodes. Resource grant allocations, such as uplink grant allocations, can be prioritized for these relay nodes over other relay nodes that are serving a smaller quantity of high-bandwidth capable end-users.

Exemplary heterogeneous wireless networks described herein include donor access nodes and relay nodes that are capable of communicating using a plurality of wireless air interfaces or RATs. For example, a donor access node can include a combination of a 4G eNodeB and a 5G gNodeB. In other words, the access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs. Thus, as further described herein, the donor access nodes can be part of the same or different cell sites or radio access networks (RANs), each RAN being served by a different cell site router.

Further described herein are different radio access network (RAN) configurations for EN-DC capable donor access nodes, with each RAN configuration enabling participation in dual-connectivity using at least two RATs, and variations on which component of the different RANs performs the preferential allocation of resources. Exemplary donor access nodes described herein include schedulers that are configured to perform control resource allocations, data resource allocations, or both, and coupled to different types of donor access nodes including eNodeBs, gNodeBs, etc.

For example, each donor access node can include a primary access node configured to deploy carriers utilizing the a first RAT, and the primary access node is coupled to one or more secondary access nodes, each secondary access node configured to deploy carriers utilizing a second RAT. Alternatively, each donor access node comprises a secondary access node configured to deploy carriers utilizing the second RAT, the secondary access node being coupled to a primary access node configured to deploy carriers utilizing the first RAT.

Thus, exemplary systems described herein for allocating wireless air interface resources to relay nodes include one or more donor access nodes configured to deploy at least a 4G wireless air interface and a 5G wireless air interface, and a processing node communicatively coupled to the donor access node(s). The processing node can be configured to perform any of the above operations in various combinations. These and other embodiments are further described herein and with reference to FIGS. 1-12.

FIG. 1 depicts an exemplary system 100 comprising a communication network 101, gateway 102, controller node 104, access node 110, relay nodes 120, 130, and wireless devices 125, 135. In this exemplary embodiment, access node 110 may be macrocell access nodes configured to deploy wireless air interfaces to which relay nodes 120, 130 (and other wireless devices not shown herein) can attach and access network services from network 101. Relay nodes 120, 130 may be configured to communicate with access node 110 over communication links referred to as wireless backhaul, and are further configured to deploy additional wireless air-interfaces to which wireless devices 125, 135 can attach. Relay nodes 120, 130 are thus configured to relay data between a donor access node 110 and wireless devices 125, 135, such that wireless devices 125, 135 may access network services using any one of relay nodes 120, 130 rather than overload donor access node 110 (which may be serving numerous other devices not shown herein). Moreover, wireless devices that are outside a coverage area of access node 110 may access network services from donor access node 110 by virtue of being connected to one of relay nodes 120, 130. Although only access node 110, relay nodes 120, 130, and end-user wireless devices 125, 135 are illustrated in FIG. 1, system 100 can include various other combinations of carriers/wireless air interfaces, antenna elements, access nodes, and wireless devices, as may be evident to those having ordinary skill in the art in light of this disclosure.

Further, access node 110 may be configured to deploy at least two wireless air interfaces using dual connectivity. For example, access node 110 can include a combination of an eNodeB and a gNodeB, such that each access node is be configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with one or both of relay nodes 120, 130 using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. In another example, a standalone 5G access node may be configured to deploy multiple 5G wireless air interfaces. Other implementations may be evident to those having ordinary skill in the art in light of this disclosure.

A processing node within system 100 (for example, communicatively coupled to access node 110 or any other network node) can be configured to determine whether or not each relay node 120, 130 is capable of dual connectivity and/or communication using 5G NR, and instruct the donor access node 110 to broadcast an indicator in, for example, a system information message. Responsive to the indicator, relay nodes 120, 130 can attach to donor access node 110 using the 4G wireless air interface to control and set up a dual connectivity session. In other words, control information (including SIB messages) is transmitted using the 4G LTE wireless air interface, while the 5G NR wireless air interface is utilized for transmission of data. Using the 5G RAT for data transmissions is advantageous, as 5G provides higher bandwidths and frequencies versus 4G.

In an exemplary embodiment, the processing node is further is configured to perform operations for allocating wireless air interface resources to relay nodes 120, 130 by identifying relay nodes 120, 130 as being within range of donor access node 110, and preferentially allocating wireless air interface resources to the relay nodes 120, 130 based on a bandwidth capability of end-user wireless devices 125, 135. Identifying relay nodes 120, 130 further comprises receiving a resource request from each relay node 120, 130, and/or parsing attributes of each relay node, such as a QCI, primary cell identifier (PCI), PLMN ID, etc. Further, each relay node 120, 130 can transmit information related to the bandwidth capabilities of end-user wireless devices connected thereto, such as wireless devices 125, 135. The bandwidth capability of each end-user wireless device 125, 135 can be associated with a capability of the end-user wireless device to participate in 4G LTE, 5G NR, or any other radio access technology (RAT). Alternatively or in addition, the bandwidth capability of each end-user wireless device 125, 135 can be associated with a capability of the end-user wireless device to participate in different bandwidths within the same or different RATs. Further, wireless air interface resources can be preferentially allocated to one of relay nodes 120, 130 based on the bandwidth capability of end-user wireless devices 125, 135 meeting a threshold, or based on which relay node 120, 130 is serving end-user wireless devices having a relatively higher bandwidth. Multiple method of determining the higher bandwidth capable end-user wireless devices may be utilized, such as averages, percentages, comparisons over time, etc. For example, the relay node 120, 130 serving a greater percentage of 5G capable end-user wireless devices over a configurable time period may be allocated more (or all) wireless air interface resources deployed by donor access node 110. Various other combinations of these operations may be envisioned by those having ordinary skill in the art in light of this disclosure.

Access node 110 can be any network node configured to provide communication between relay nodes 120, 130 (and end-user wireless devices 125, 135 attached thereto) and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 125, 135 may be any device, system, combination of devices, or other such communication platform capable of communicating wirelessly with relay nodes 120, 130 and/or access node 110 using one or more frequency bands deployed therefrom. Wireless devices 125, 135 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 125, 135. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of relay nodes 120, 130 and end-user wireless devices attached thereto, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, relay nodes 120, 130, gateway(s) 102, controller node 104, and/or network 101.

Figure 2:
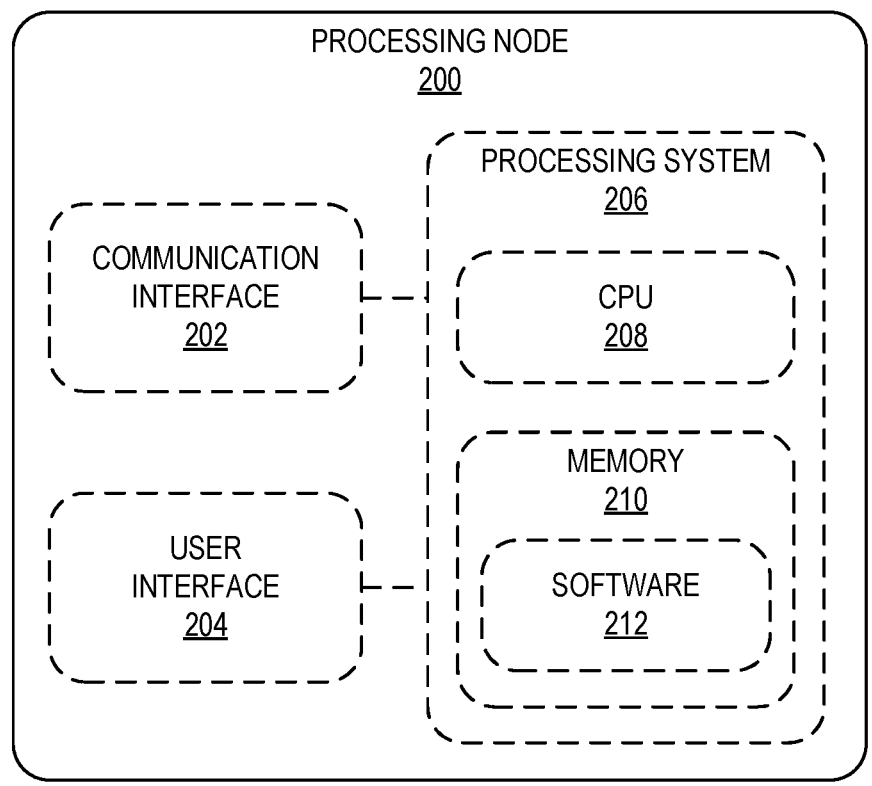
FIG. 2 depicts an exemplary processing node for allocating wireless air interface resources to relay nodes based on end-user wireless device capabilities.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for allocating wireless air interface resources to relay nodes based on end-user wireless device capabilities by determining that a relay node within range of a donor access node is serving a threshold quantity of end-user wireless devices having a high bandwidth capability, and prioritizing data packets associated with the relay node over other data packets traversing the donor access node. Determining that the relay node is serving the threshold quantity of end-user wireless devices having the high bandwidth capability can include receiving an indicator from the relay node indicating a quantity of high bandwidth capability end-user wireless devices being served by the relay node. The indicator can be transmitted in an uplink channel, such as a physical uplink shared channel (PUSCH). Based on the indicator, it can be determined that the quantity of high bandwidth capability end-user wireless devices being served by the relay node exceeds a quantity of low bandwidth capability end-user wireless devices being served by the relay node. End-user wireless devices having the high bandwidth capability comprise 5G capable end-user wireless devices. The high bandwidth capability may be compared with 4G capable end-user wireless devices, which typically use a lower bandwidth than 5G capable end-user wireless devices. Alternatively or in addition, end-user wireless devices having the high bandwidth capability comprise 5G capable end-user wireless devices with a bandwidth capability that meets a threshold bandwidth capability. For example, 5G capable end-user wireless devices attached to a first relay node may be configured to utilize a higher channel bandwidth than 5G capable end-user wireless devices attached to a second relay node.

In another exemplary embodiment, software 212 can include instructions for allocating wireless air interface resources to relay nodes based on end-user wireless devices attached to the relay nodes by determining that a first relay node within range of a donor access node is serving a quantity of 5G-capable end-user wireless devices, the first quantity meeting a threshold, and prioritizing data packets received from the first relay node over data packets received from any other relay node that is not serving a threshold quantity of 5G-capable end-user wireless devices.

In another exemplary embodiment, software 212 can include instructions allocating wireless air interface resources to relay nodes based on end-user wireless devices attached to the relay nodes by receiving, at a donor access node, a first resource request from a first relay node serving a first one or more end-user wireless devices, receiving, at the donor access node, a second resource request from a second relay node serving a second one or more end-user wireless devices, and preferentially allocating wireless air interface resources to one of the first or second relay nodes based on a bandwidth capability of the first or second one or more end-user wireless devices. Preferentially allocating wireless air interface resources is performed for one of the first and second relay nodes that is serving end-user wireless devices that have a relatively higher bandwidth capability. The bandwidth capability of the end-user wireless devices is associated with a radio access technology (RAT), and wherein the relatively higher bandwidth capability is associated with a $5^{th}$ generation (5G) RAT. Further, preferentially allocating resources can include prioritizing data packets received from the relay node serving the end-user wireless devices with the relatively higher bandwidth capability. Resources can be allocated by a scheduler coupled to the donor access node. For collocated donor access nodes, i.e. donor access nodes capable of multi-RAT communication at a single cell site or radio access network (RAN), the scheduler may be communicatively coupled to modules associated with either or both RATs. For example, collocated EN-DC access nodes can include both an eNodeB and a gNodeB, and each NodeB has its own scheduler for scheduling control and/or data packets using each RAN. Alternatively or in addition, a first scheduler for scheduling control transmissions can be coupled to an eNodeB, and a second scheduler for scheduling data transmissions can be coupled to a gNodeB. In some embodiments, both first and second scheduler can be configured for scheduling either control or data transmissions. Further, in an exemplary embodiment where the donor access node is a standalone gNodeB, the scheduler is coupled to the gNodeB. Other combinations of schedulers and donor access nodes configured for different types of transmissions using different RATs may be envisioned by those having ordinary skill in the art in light of this disclosure.

In another exemplary embodiment, software 212 can include instructions for allocating wireless air interface resources to relay nodes based on end-user wireless devices attached to the relay nodes by identifying a first relay node within range of a donor access node, identifying a second relay node within range of the donor access node, and preferentially allocating wireless air interface resources to one of the first or second relay nodes based on a bandwidth capability of end-user wireless devices attached to each relay node. Identifying the first and second relay nodes can be based on a unique identifier associated with the relay node, the unique identified comprising at least one of a public land mobile number (PLMN), a primary cell identifier (PCI), or a quality of service control identifier (QCI). The method can further include receiving an indicator from each relay node indicating the bandwidth capability of the end-user wireless devices attached thereto. Further, wireless air interface resources can be preferentially allocated to one of the first or second relay nodes that are serving at least a threshold quantity of end-user wireless devices with a high bandwidth capability. For example, the relay node serving a threshold (or greater) quantity of 5G capable end-user wireless devices can be granted more or all available uplink, downlink, or other wireless air interface resources.

In another exemplary embodiment, software 212 can include instructions for prioritizing relay nodes serving end-user wireless devices meeting a bandwidth criteria by determining that a first bandwidth capability of end-user wireless devices attached to a first relay node meets a threshold, determining that a second bandwidth capability of end-user wireless devices attached to a second relay node does not meets a threshold, wherein both first and second relay nodes are attached to a donor access node, and prioritizing data packets received at the donor access node from the first relay node over data packets received at the donor access node from the second relay node.

Figure 3:
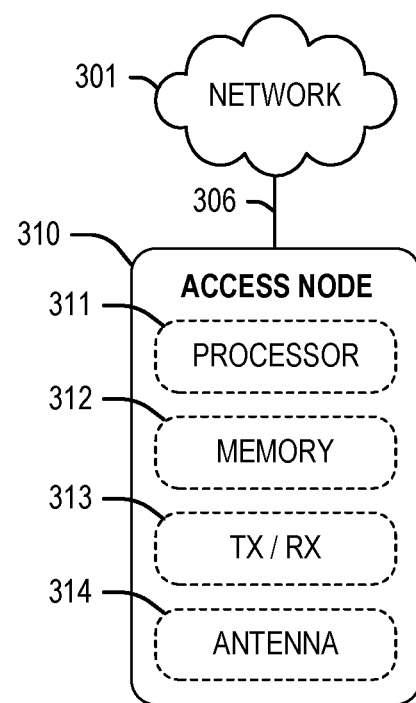
FIG. 3 depicts an exemplary access node for allocating wireless air interface resources to relay nodes based on end-user wireless device capabilities.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

In an exemplary embodiment, memory 312 can store instructions for allocating wireless air interface resources to relay nodes based on end-user wireless device capabilities by determining that a relay node within range of a donor access node is serving a threshold quantity of end-user wireless devices having a high bandwidth capability, and prioritizing data packets associated with the relay node over other data packets traversing the donor access node. In another exemplary embodiment, memory 312 can store instructions for allocating wireless air interface resources to relay nodes based on end-user wireless devices attached to the relay nodes by determining that a first relay node within range of a donor access node is serving a quantity of 5G-capable end-user wireless devices, the first quantity meeting a threshold, and prioritizing data packets received from the first relay node over data packets received from any other relay node that is not serving a threshold quantity of 5G-capable end-user wireless devices. In another exemplary embodiment, memory 312 can store instructions allocating wireless air interface resources to relay nodes based on end-user wireless devices attached to the relay nodes by receiving, at a donor access node, a first resource request from a first relay node serving a first one or more end-user wireless devices, receiving, at the donor access node, a second resource request from a second relay node serving a second one or more end-user wireless devices, and preferentially allocating wireless air interface resources to one of the first or second relay nodes based on a bandwidth capability of the first or second one or more end-user wireless devices. In another exemplary embodiment, memory 312 can store instructions for allocating wireless air interface resources to relay nodes based on end-user wireless devices attached to the relay nodes by identifying a first relay node within range of a donor access node, identifying a second relay node within range of the donor access node, and preferentially allocating wireless air interface resources to one of the first or second relay nodes based on a bandwidth capability of end-user wireless devices attached to each relay node. In another exemplary embodiment, memory 312 can store instructions for prioritizing relay nodes serving end-user wireless devices meeting a bandwidth criteria by determining that a first bandwidth capability of end-user wireless devices attached to a first relay node meets a threshold, determining that a second bandwidth capability of end-user wireless devices attached to a second relay node does not meets a threshold, wherein both first and second relay nodes are attached to a donor access node, and prioritizing data packets received at the donor access node from the first relay node over data packets received at the donor access node from the second relay node.

Figure 4:
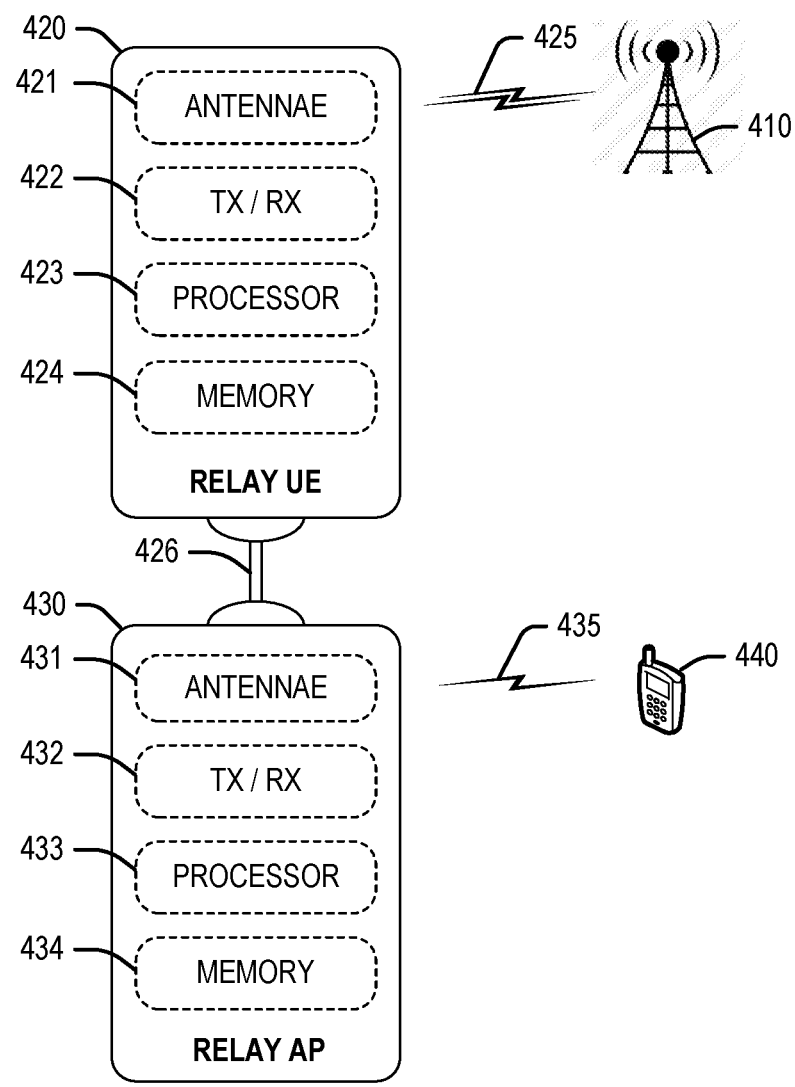
FIG. 4 depicts an exemplary relay node.

FIG. 4 depicts an exemplary relay node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface. Transceivers 422 can include transceivers capable of dual connectivity. For example, transceivers 422 can include a combination of transceivers capable of communicating via 4G LTE and 5G NR simultaneously. Antennae 421 can be similarly enabled for 5G EN-DC transmissions.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay. Further, memory 424 can include instructions for transmitting an identifier of relay UE 420 to donor access node 410, such as a QCI, PCI, or PLMN ID. Further, memory 424 can include instructions for transmitting information related to bandwidth capabilities of end-user wireless device 440 attached to relay AP 430, enabling donor access node 410 to perform the resource allocation operations described herein.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements.

Figure 5:
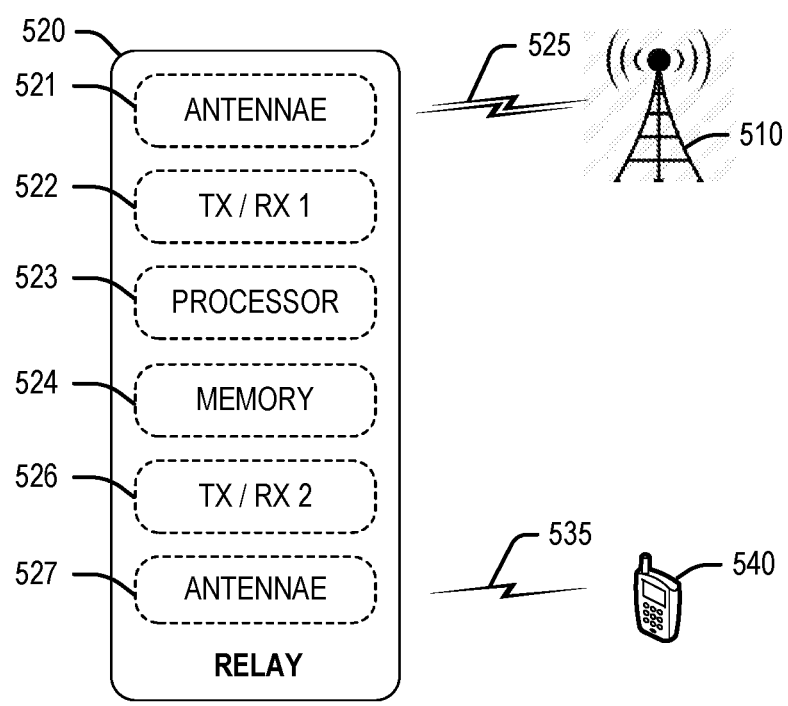
FIG. 5 depicts another exemplary relay node.

In another exemplary embodiment, the relay node may integrate components of a relay wireless device and a relay access point into a single unit. FIG. 5 depicts such an exemplary relay node 520. Relay node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay node 520 further includes another transceiver 526 and antenna 527 for enabling communication with wireless device 540. Relay node 520 can perform operations similar to those described with respect to FIG. 4.

In an embodiment, the relay nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/reassembly). In other words, relay node depicted herein performs demodulation and decoding of the received RF signals (either uplink or downlink), processes received data, then encodes, modulates, and transmits the data to a wireless device.

Figure 6:
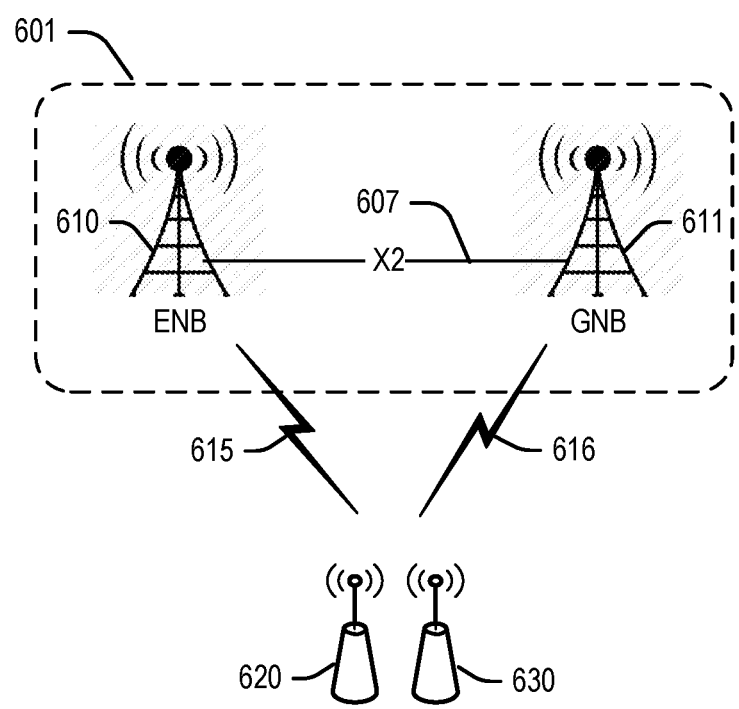
FIG. 6 depicts preferential resource allocation for relay nodes in an exemplary 5G EN-DC radio access network.

FIG. 6 depicts exemplary resource allocation for relay nodes in a 5G EN-DC radio access network (RAN) 601. RAN 601 includes colocated access nodes 610, 611, and may include other components not shown herein for convenience, such as cell site routers, controllers, etc. Further, RAN 601 may be connected to other intermediate or core networks. In this exemplary embodiment, access node 610 can include a eNodeB, and access node 611 can include a gNodeB. For example, access node 610 can be configured to deploy a wireless interface 615 using a first radio access technology (RAT), e.g. 4G LTE, and access node 611 can be configured to deploy a second wireless interface 616 using a second RAT, e.g. 5G NR. Each RAT can be configured to utilize a different frequency band or sub-band, a different channel size or bandwidth, and so on. For example, the 5G NR wireless interface 616 can be configured to utilize higher frequencies and larger channel bandwidths than the 4G LTE wireless interface 615.

Further, access nodes 610, 611 can be configured to communicate using both RATs at the same time. For example, dual connections can be set up with any of relay nodes 620, 630 using both 4G and 5G air interfaces 615, 625 respectively, the 4G wireless interface 615 being used to transmit control information, and the 5G wireless interface 616 being used to transmit data information. For example, a processing node within RAN 601 (for example, communicatively coupled to access nodes 610, 611, or any other network node) can be configured to determine whether or not relay nodes 620, 630 are capable of communicating using both RATs (e.g. capable of 5G EN-DC), and instruct the access node 610 to broadcast an indicator in, for example, a system information message. Responsive to the indicator, relay nodes 620, 630 can attach to access node 610 which can use the 4G carrier to control and set up a dual connectivity session with the relay node 620, 630. In other words, control information (including SIB messages) is transmitted from the access node 610 using the 4G LTE air interface, while the 5G NR air interface is utilized for transmission of data via access node 611. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth.

Further, within radio access network 602, access nodes 610 and 611 can be coupled via a direct communication link 607, which can include an X2 communication link. Access nodes 610 and 611 can communicate control and data information across X2 communication link 607. In an exemplary embodiment, access node 611 includes logic to determine how to allocate data packets between access node 610 and access node 611, wherein the data packets flow between relay nodes 620, 630 and any external network node. Such logic may include a packet data convergence protocol (PDCP) function. Thus, RAN 601 can include a plurality of antenna elements (not shown herein) coupled to access nodes 610 and 611, with different antenna elements configured to deploy a different radio air interface using a different frequency.

Thus, the processing node within RAN 601 can be configured to prioritize resource allocation for relay nodes that are serving high-bandwidth end-user wireless devices, versus other relay nodes that are not serving such wireless devices (or are serving relatively smaller quantity of high-bandwidth end-user wireless devices). In particular, when the RAN 601 is loaded (i.e. has limited wireless air interface resources available), preferentially allocating resources to relay nodes serving high-bandwidth end-user wireless devices ensures quality of service for the end-user wireless devices. The bandwidth capability can be based information transmitted from each relay node 620, 630 to RAN 601, for example, on a PUSCH. Resource grant allocations, such as uplink grant allocations, can be prioritized for the relay nodes indicating that they are serving a threshold (or relatively higher) quantity of high-bandwidth capable end-user wireless devices. For example, the threshold may be based on a percentage of 5G capable end-user wireless devices being served by each relay node 620, 630.

Figure 7:
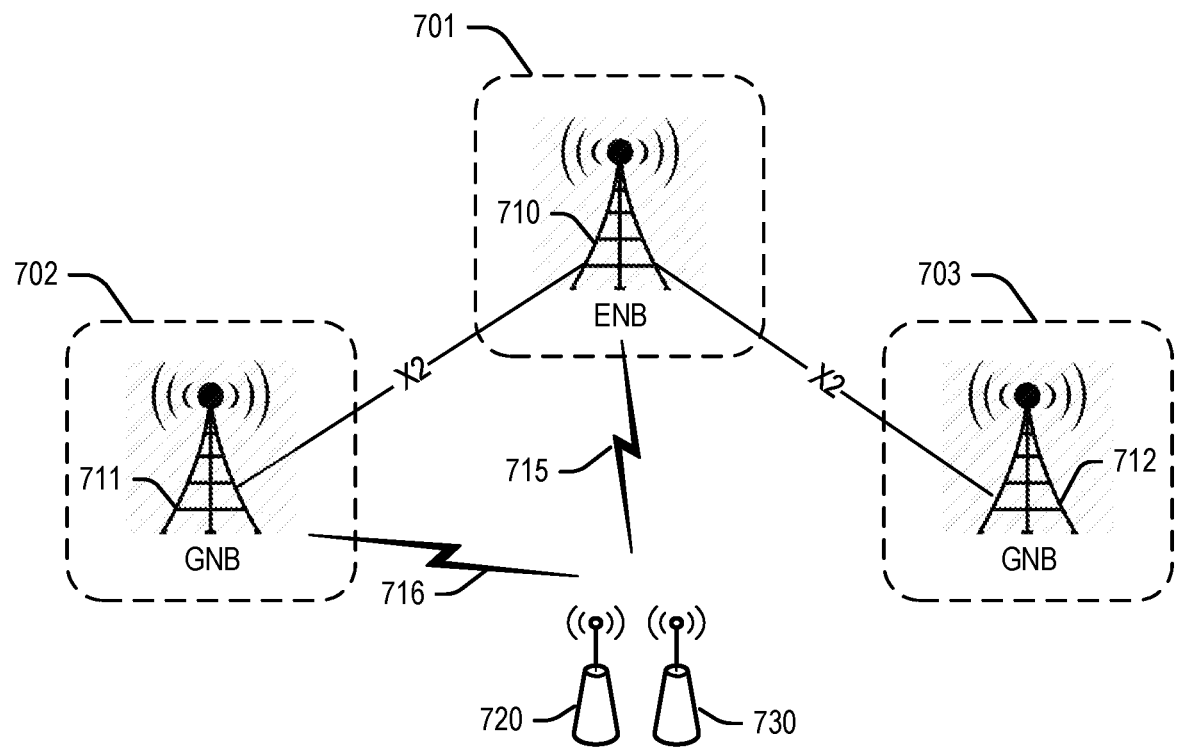
FIG. 7 depicts preferential resource allocation for relay nodes in an another exemplary 5G EN-DC radio access network.

FIG. 7 depicts exemplary resource allocation for relay nodes in another 5G EN-DC system. Each of RANs 701, 702, 703 includes at least access nodes 710, 711, 712 respectively. This embodiment depicts a one-to-many configuration, in which an eNodeB 710 is designated as a primary donor access node for wireless devices and relay nodes (such as relay node 720, 730), and one or more gNodeBs 711, 712 are selected as secondary donor access nodes, as further described below. Persons having ordinary skill in the art may note that other components may be included in any combination, without materially affecting the scope and spirit of the described embodiments.

In this exemplary embodiment, access node 710 can include a eNodeB, and access nodes 711, 712 can include gNodeBs. For example, access node 710 can be configured to deploy a wireless interface 715 using a first radio access technology (RAT), e.g. 4G LTE, and access nodes 711, 712 can be configured to deploy wireless interfaces using a second RAT, e.g. 5G NR. Further, access nodes 710, 711, 712 can be configured to communicate using both RATs at the same time. For example, dual connections can be set up with one or both of relay nodes 720, 730 using both 4G and 5G air interfaces respectively, the 4G wireless interface 715 being used to transmit control information, and one of the 5G wireless interfaces (e.g. 5G interface 716) being used to transmit data information. For example, a processing node communicatively coupled to access node 710 can be configured to determine whether or not relay nodes 720, 730 are capable of communicating using both RATs (e.g. capable of 5G EN-DC), and instruct the access node 710 to broadcast an indicator in, for example, a system information message. Responsive to the indicator, relay nodes 720, 730 can attach to access node 710 which can use the 4G carrier to control and set up a dual connectivity session with relay node 720, 730. Further, access node 710 can be configured to select one (or more) of access nodes 711, 712 as a secondary donor access node, to transport user data. In other words, control information (including SIB messages) is transmitted from the access node 710 using the 4G LTE air interface, while the 5G NR air interfaces (e.g. 5G NR air interface 716) is utilized for transmission of data. Further, access nodes 711 and 712 (hereinafter "secondary donor access nodes") can each be coupled to access node 710 (hereinafter "primary donor access node") via X2 communication links. In an exemplary embodiment, each secondary donor access node 711, 712 can include logic to determine how to allocate data packets between the donor access nodes, wherein the data packets flow between relay nodes 720, 730 and a network node not shown herein. Such logic may include a packet data convergence protocol (PDCP) function.

Further, a processing node communicatively coupled to any of access nodes 710, 711, 712 can be configured to allocate air interface resources to relay nodes 720, 730 by determining a bandwidth capability of end-user wireless devices attached to each of relay nodes 720, 730 (not shown herein), and preferentially allocating wireless air interface resources to the relay nodes 720, 730 based on the bandwidth capability. Each relay node 720, 730 can transmit information related to the bandwidth capabilities of end-user wireless devices connected thereto. The bandwidth capability of each end-user wireless device can be associated with a capability of the end-user wireless device to participate in 4G LTE, 5G NR, or any other radio access technology (RAT). Alternatively or in addition, the bandwidth capability of each end-user wireless device can be associated with a capability of the end-user wireless device to participate in different bandwidths within the same or different RATs. Further, wireless air interface resources can be preferentially allocated to one of relay nodes 720, 730 based on the bandwidth capability of the end-user wireless devices meeting a threshold, or based on which relay node 720, 730 is serving end-user wireless devices having a relatively higher bandwidth. Multiple method of determining the higher bandwidth capable end-user wireless devices may be utilized, such as averages, percentages, comparisons over time, etc. For example, the relay node 720, 730 serving a greater percentage of 5G capable end-user wireless devices over a configurable time period may be allocated more (or all) wireless air interface resources deployed by donor access node 710. Various other combinations of these operations may be envisioned by those having ordinary skill in the art in light of this disclosure, including the operations further described below with reference to FIGS. 8-12.

Figure 8:
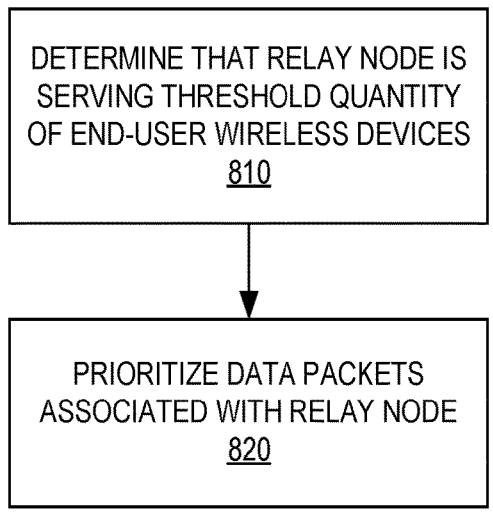
FIG. 8 depicts an exemplary method for allocating wireless air interface resources to relay nodes based on end-user wireless device capabilities.

FIG. 8 depicts an exemplary method for allocating wireless air interface resources to relay nodes based on a bandwidth capability of end-user wireless devices. The method of FIG. 8 may be implemented by a processing node communicatively coupled to one or more access nodes, controller nodes, or any other network node. Although FIG.

8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, it is determined that a relay node is serving a threshold quantity of high bandwidth end-user wireless devices. The relay node may be one of a plurality of relay nodes within range of a donor access node. An exemplary donor access node can include a combination of a 4G eNodeB and a 5G gNodeB. In other words, the donor access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs. Further, determining that the relay node is serving the threshold quantity of end-user wireless devices having the high bandwidth capability can include receiving an indicator from the relay node indicating a quantity of high bandwidth capability end-user wireless devices being served by the relay node. The indicator can be transmitted in an uplink channel, such as a physical uplink shared channel (PUSCH). Based on the indicator, it can be determined that the quantity of high bandwidth capability end-user wireless devices being served by the relay node exceeds a quantity of low bandwidth capability end-user wireless devices being served by the relay node. End-user wireless devices having the high bandwidth capability comprise 5G capable end-user wireless devices. The high bandwidth capability may be compared with 4G capable end-user wireless devices, which typically use a lower bandwidth than 5G capable end-user wireless devices. Alternatively or in addition, end-user wireless devices having the high bandwidth capability comprise 5G capable end-user wireless devices with a bandwidth capability that meets a threshold bandwidth capability. For example, 5G capable end-user wireless devices attached to a first relay node may be configured to utilize a higher channel bandwidth than 5G capable end-user wireless devices attached to a second relay node.

At 820, data packets associated with the relay node are prioritized over other data packets traversing the donor access node. This can include increasing a resource allocation for the relay node that is serving the high bandwidth end-user wireless devices. The resource allocation can include allocation of uplink resources, downlink resources, resource grants for different types of traffic, etc. Further, prioritizing data packets can include preferentially allocating wireless air interface resources to a first relay node over a second relay node based on a bandwidth capability of the end-user wireless devices attached to each relay node. For example, preferentially allocating wireless air interface resources is performed for one of the first and second relay nodes that is serving end-user wireless devices that have a relatively higher bandwidth capability. The bandwidth capability of the end-user wireless devices is associated with a radio access technology (RAT), and wherein the relatively higher bandwidth capability is associated with a $5^{th}$ generation (5G) RAT. Further, preferentially allocating resources can include prioritizing data packets received from the relay node serving the end-user wireless devices with the relatively higher bandwidth capability.

In an exemplary embodiment, resources are allocated by a scheduler coupled to the donor access node. For collocated donor access nodes, i.e. donor access nodes capable of multi-RAT communication at a single cell site or radio access network (RAN), the scheduler may be communicatively coupled to modules associated with either or both RATs. For example, collocated EN-DC access nodes can include both an eNodeB and a gNodeB, and each NodeB has its own scheduler for scheduling control and/or data packets using each RAN. Alternatively or in addition, a first scheduler for scheduling control transmissions can be coupled to an eNodeB, and a second scheduler for scheduling data transmissions can be coupled to a gNodeB. In some embodiments, both first and second scheduler can be configured for scheduling either control or data transmissions. Further, in an exemplary embodiment where the donor access node is a standalone gNodeB, the scheduler is coupled to the gNodeB. Other combinations of schedulers and donor access nodes configured for different types of transmissions using different RATs may be envisioned by those having ordinary skill in the art in light of this disclosure.

Another method for allocating wireless air interface resources to relay nodes based on end-user wireless devices attached to the relay nodes includes receiving, at a donor access node, a first resource request from a first relay node serving a first one or more end-user wireless devices, receiving, at the donor access node, a second resource request from a second relay node serving a second one or more end-user wireless devices, and preferentially allocating wireless air interface resources to one of the first or second relay nodes based on a bandwidth capability of the first or second one or more end-user wireless devices.

Figure 9:
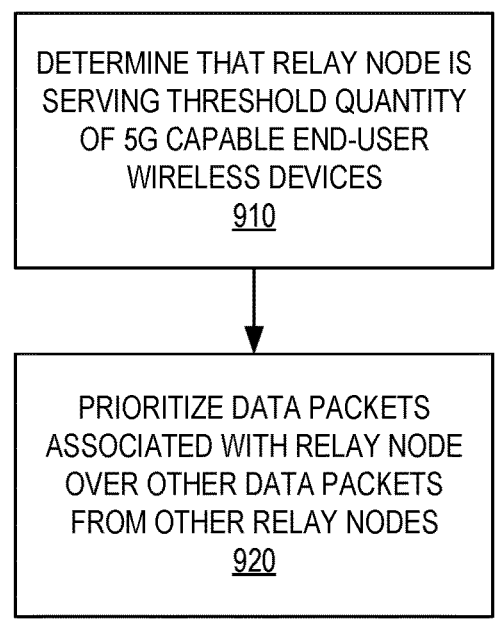
FIG. 9 depicts another exemplary method for allocating wireless air interface resources to relay nodes based on end-user wireless device capabilities.

FIG. 9 depicts another exemplary method allocating wireless air interface resources to relay nodes based on a bandwidth capability of end-user wireless devices. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

This exemplary method includes determining, at 910, that a first relay node within range of a donor access node is serving a quantity of 5G-capable end-user wireless devices, the first quantity meeting a threshold, and at 920, prioritizing data packets received from the first relay node over data packets received from any other relay node that is not serving a threshold quantity of 5G-capable end-user wireless devices. Each donor access node is capable of participating in dual-connectivity using at least two RATs, e.g. 4G LTE and 5G NR. As described above, in the collocated RAN, the donor access node comprises both an eNodeB for 4G LTE communication and a gNodeB for 5G NR communication. In another situation, the donor access node comprises a primary access node configured to utilize a first RAT (e.g. 4G LTE), and is coupled to one or more secondary access nodes, each secondary access node configured to utilize the second RAT (e.g. 5G NR). In this situation, each access node can be part of a different RAN, and served by a different cell site router. Further, in each of these deployments, the donor access node can include either the primary or the secondary access node, in any combination. Thus, a scheduler coupled to any of the donor access nodes can be configured to perform the operations described herein, using any combination of RATs.

Figure 10:
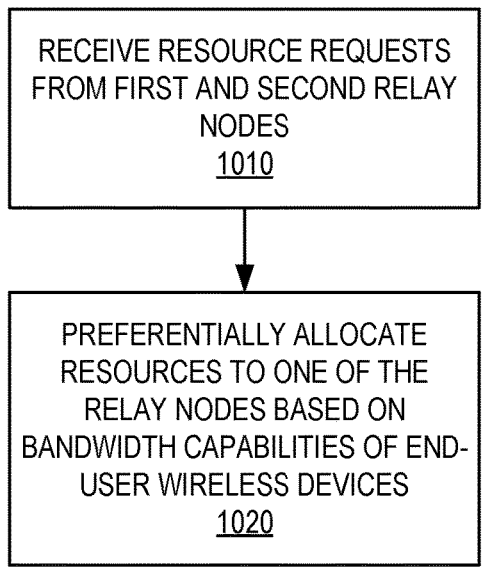
FIG. 10 depicts another exemplary method for allocating wireless air interface resources to relay nodes based on end-user wireless device capabilities.

FIG. 10 depicts another exemplary method for allocating wireless air interface resources to relay nodes based on a bandwidth capability of end-user wireless devices. The method of FIG. 10 may be implemented by a processing node communicatively coupled to one or more access nodes, controller nodes, or any other network node. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, resource requests are received from first and second relay nodes within range of a donor access node. The resource requests from each relay node can include an indicator from the relay node indicating a quantity of high bandwidth capability end-user wireless devices being served by the relay node. The indicator can be transmitted in an uplink channel, such as a physical uplink shared channel (PUSCH). Based on the indicator, it can be determined that the quantity of high bandwidth capability end-user wireless devices being served by the relay node exceeds a quantity of low bandwidth capability end-user wireless devices being served by the relay node. End-user wireless devices having the high bandwidth capability comprise 5G capable end-user wireless devices. The high bandwidth capability may be compared with 4G capable end-user wireless devices, which typically use a lower bandwidth than 5G capable end-user wireless devices. Alternatively or in addition, end-user wireless devices having the high bandwidth capability comprise 5G capable end-user wireless devices with a bandwidth capability that meets a threshold bandwidth capability. For example, 5G capable end-user wireless devices attached to a first relay node may be configured to utilize a higher channel bandwidth than 5G capable end-user wireless devices attached to a second relay node.

At 1020, data packets associated with the relay node are prioritized over other data packets traversing the donor access node. This can include increasing a resource allocation for the relay node that is serving the high bandwidth end-user wireless devices. The resource allocation can include allocation of uplink resources, downlink resources, resource grants for different types of traffic, etc. Further, prioritizing data packets can include preferentially allocating wireless air interface resources to a first relay node over a second relay node based on a bandwidth capability of the end-user wireless devices attached to each relay node. For example, preferentially allocating wireless air interface resources is performed for one of the first and second relay nodes that is serving end-user wireless devices that have a relatively higher bandwidth capability. The bandwidth capability of the end-user wireless devices is associated with a radio access technology (RAT), and wherein the relatively higher bandwidth capability is associated with a $5^{th}$ generation (5G) RAT. Further, preferentially allocating resources can include prioritizing data packets received from the relay node serving the end-user wireless devices with the relatively higher bandwidth capability.

Figure 11:
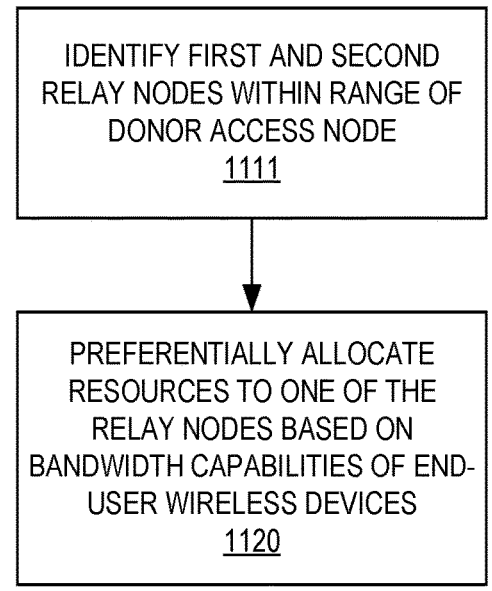
FIG. 11 depicts another exemplary method for allocating wireless air interface resources to relay nodes based on end-user wireless device capabilities.

FIG. 11 depicts another exemplary method for allocating wireless air interface resources to relay nodes based on a bandwidth capability of end-user wireless devices. The method of FIG. 11 may be implemented by a processing node communicatively coupled to one or more access nodes, controller nodes, or any other network node. Although FIG. 11 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1111, first and second relay nodes are identified as being within range of a donor access node. The relay nodes may be identified based on resource requests from each relay node which can also include an indicator from the relay node indicating a quantity of high bandwidth capability end-user wireless devices being served by the relay node. The indicator can be transmitted in an uplink channel, such as a physical uplink shared channel (PUSCH). Based on the indicator, it can be determined that the quantity of high bandwidth capability end-user wireless devices being served by the relay node exceeds a quantity of low bandwidth capability end-user wireless devices being served by the relay node. End-user wireless devices having the high bandwidth capability comprise 5G capable end-user wireless devices. The high bandwidth capability may be compared with 4G capable end-user wireless devices, which typically use a lower bandwidth than 5G capable end-user wireless devices. Alternatively or in addition, end-user wireless devices having the high bandwidth capability comprise 5G capable end-user wireless devices with a bandwidth capability that meets a threshold bandwidth capability. For example, 5G capable end-user wireless devices attached to a first relay node may be configured to utilize a higher channel bandwidth than 5G capable end-user wireless devices attached to a second relay node.

At 1120, data packets associated with the relay node are prioritized over other data packets traversing the donor access node. This can include increasing a resource allocation for the relay node that is serving the high bandwidth end-user wireless devices. The resource allocation can include allocation of uplink resources, downlink resources, resource grants for different types of traffic, etc. Further, prioritizing data packets can include preferentially allocating wireless air interface resources to a first relay node over a second relay node based on a bandwidth capability of the end-user wireless devices attached to each relay node. For example, preferentially allocating wireless air interface resources is performed for one of the first and second relay nodes that is serving end-user wireless devices that have a relatively higher bandwidth capability. The bandwidth capability of the end-user wireless devices is associated with a radio access technology (RAT), and wherein the relatively higher bandwidth capability is associated with a $5^{th}$ generation (5G) RAT. Further, preferentially allocating resources can include prioritizing data packets received from the relay node serving the end-user wireless devices with the relatively higher bandwidth capability.

Figure 12:
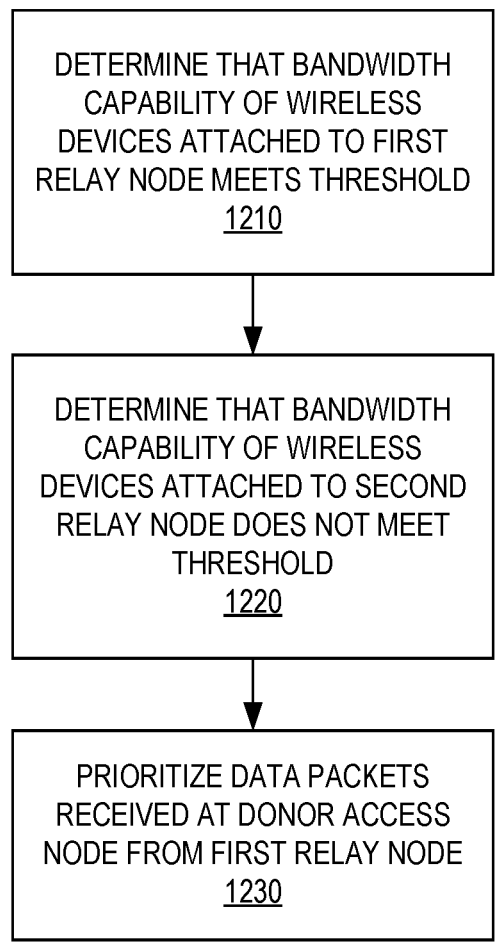
FIG. 12 depicts another exemplary method for allocating wireless air interface resources to relay nodes based on end-user wireless device capabilities.

FIG. 12 depicts another exemplary method for allocating wireless air interface resources to relay nodes based on a bandwidth capability of end-user wireless devices. The method of FIG. 12 may be implemented by a processing node communicatively coupled to one or more access nodes, controller nodes, or any other network node. Although FIG. 12 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1210 it is determined that a bandwidth capability of wireless devices attached to a first relay node meets a threshold. At 1220 it is determined that a bandwidth capability of wireless devices attached to a second relay node does not meet the threshold. Therefore, at 1230, data packets received at the donor access node from the first relay node (or destined to the first relay node via the donor access node) are prioritized, versus data packets received at the donor access node from the second relay node (or destined to the second relay node via the donor access node).

Further, while 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described allocations of resources for relay nodes serving end-user wireless devices having different bandwidth capabilities is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for allocating wireless air interface resources to relay nodes based on end-user wireless device capabilities, the method comprising:
    determining that a relay node within range of a donor access node is serving a threshold quantity of high bandwidth capability end-user wireless devices having a high bandwidth capability relative to one or more low bandwidth capability end-user wireless devices served by the relay node; and
    prioritizing data packets associated with the relay node over other data packets traversing the donor access node.

2. The method of claim 1, wherein determining that the relay node is serving the threshold quantity of high bandwidth capability end-user wireless devices comprises receiving an indicator from the relay node indicating a quantity of high bandwidth capability end-user wireless devices being served by the relay node.

3. The method of claim 2, further comprising determining, based on the indicator, that the quantity of high bandwidth capability end-user wireless devices being served by the relay node exceeds a quantity of low bandwidth capability end-user wireless devices being served by the relay node.

4. The method of claim 1, wherein the high bandwidth capability end-user wireless devices comprise 5G capable end-user wireless devices.

5. The method of claim 4, wherein the high bandwidth capability end-user wireless devices comprise 5G capable end-user wireless devices with a bandwidth capability that meets a threshold bandwidth capability.

6. The method of claim 1, wherein prioritizing data packets associated with the relay node over other data packets traversing the donor access node comprises increasing a resource allocation for the relay node.

7. The method of claim 1, further comprising determining that a second relay node within range of the donor access node is serving a second quantity of end-user wireless devices, and prioritizing data packets comprises preferentially allocating wireless air interface resources to the relay node over the second relay node based on a bandwidth capability of the end-user wireless devices attached to each relay node.

8. A method for allocating wireless air interface resources to relay nodes based on end-user wireless devices attached to the relay nodes, the method comprising:
    receiving, at a donor access node, a first resource request from a first relay node serving a first one or more end-user wireless devices;
    receiving, at the donor access node, a second resource request from a second relay node serving a second one or more end-user wireless devices; and
    preferentially allocating wireless air interface resources to one of the first or second relay nodes based on a bandwidth capability of the first or second one or more end-user wireless devices.

9. The method of claim 8, further comprising preferentially allocating wireless air interface resources to one of the first and second relay nodes that is serving end-user wireless devices that have a relatively higher bandwidth capability.

10. The method of claim 9, wherein the bandwidth capability of the end-user wireless devices is associated with a radio access technology (RAT), and wherein the relatively higher bandwidth capability is associated with a $5^{th}$ generation (5G) RAT.

11. The method of claim 9, wherein preferentially allocating resources comprises prioritizing data packets received from the relay node serving the end-user wireless devices with the relatively higher bandwidth capability.

12. The method of claim 8, wherein each donor access node is capable of participating in dual-connectivity using at least one of a first radio access technology (RAT) and a second RAT.

13. The method of claim 12, wherein each donor access node comprises a primary access node configured to deploy carriers utilizing the first RAT, the primary access node is coupled to one or more secondary access nodes, each secondary access node configured to deploy carriers utilizing the second RAT.

14. The method of claim 12, wherein each donor access node comprises a secondary access node configured to deploy carriers utilizing the second RAT, the secondary access node being coupled to a primary access node configured to deploy carriers utilizing the first RAT.

15. The method of claim 8, further comprising identifying the relay node based on a unique identifier associated with the relay node, the unique identified comprising at least one of a public land mobile number (PLMN), a primary cell identifier (PCI), or a quality of service control identifier (QCI).

16. A system for allocating wireless air interface resources to relay nodes in heterogeneous networks, the system comprising:
- a processing node; and
- a processor communicatively coupled to the processing node, the processor being configured to perform operations comprising:
  - determining that a first bandwidth capability of end-user wireless devices attached to a first relay node meets a threshold;
  - determining that a second bandwidth capability of end-user wireless devices attached to a second relay node does not meets a threshold, wherein both first and second relay nodes are attached to a donor access node; and
  - prioritizing data packets received at the donor access node from the first relay node over data packets received at the donor access node from the second relay node.

17. The system of claim 16, wherein the operations further comprise receiving an indicator from each relay node indicating the bandwidth capability of the end-user wireless devices attached thereto.

18. The system of claim 16, wherein prioritizing data packets comprises preferentially allocating wireless air interface resources to the first relay node.

19. The system of claim 16, further comprising identifying each relay node based on a unique identifier associated with each relay node, the unique identified comprising at least one of a public land mobile number (PLMN), a primary cell identifier (PCI), or a quality of service control identifier (QCI).

20. The system of claim 16, wherein the operations further comprise instructing the first relay node to attach to the donor access node via at least two RATs simultaneously.

* * * * *